United States Patent [19]
Abe

[11] Patent Number: 5,233,381
[45] Date of Patent: Aug. 3, 1993

[54] VIEW FINDER OF CAMERA HAVING MACRO PHOTOGRAPHING MODE

[75] Inventor: Tetsuya Abe, Hokkaido, Japan

[73] Assignee: Asahi Kogaku Kogyo Kabushiki Kaisha, Tokyo, Japan

[21] Appl. No.: 867,391

[22] Filed: Apr. 13, 1992

[30] Foreign Application Priority Data

Apr. 16, 1991 [JP] Japan .................................. 3-55369

[51] Int. Cl.$^5$ .............................................. G03B 13/10
[52] U.S. Cl. .................................... 354/222; 354/221; 354/164
[58] Field of Search ............... 354/219, 221, 222, 224, 354/225, 199, 164, 166

[56] References Cited

U.S. PATENT DOCUMENTS

| | | |
|---|---|---|
| 3,668,993 | 6/1972 | Kurie . |
| 4,164,369 | 8/1979 | Urano et al. . |
| 4,478,493 | 10/1984 | Yokota .................. 354/222 |
| 4,757,336 | 7/1988 | Nakayama ............ 354/219 |
| 4,833,497 | 5/1989 | Sugawara . |
| 4,854,680 | 8/1989 | Kikuchi .................. 354/222 |
| 4,924,247 | 5/1990 | Suzuki et al. . |
| 4,944,030 | 7/1990 | Haraguchi et al. . |
| 5,012,273 | 4/1991 | Nakamura et al. . |
| 5,052,787 | 10/1991 | Sugawara . |
| 5,081,480 | 1/1992 | Abe . |
| 5,117,247 | 5/1992 | Nakai et al. ........... 354/222 |

Primary Examiner—Monroe H. Hayes
Attorney, Agent, or Firm—Sandler Greenblum & Bernstein

[57] ABSTRACT

A view finder of a camera includes a taking optical system, and a finder optical system which is separate from the taking optical system. The view finder has a normal photographic mode and a macro photographic mode. The finder optical system includes a field frame having a photographic field correcting mark at a close object distance in the normal photographic mode, and a variable power lens group for varying the magnification of the finder, so that the variable power lens group decreases the finder magnification in association with the shift from the normal photographic mode to the macro photographic mode.

14 Claims, 6 Drawing Sheets

VIEW FINDER OF CAMERA HAVING MACRO PHOTOGRAPHING MODE

BACKGROUND OF THE INVENTION

1. Field of the Invention

The present invention relates to a view finder of a camera and more precisely relates to a view finder of a camera having a finder optical system separate from a taking optical system and a macro photographing mode.

This application is related to the commonly assigned U.S. Ser. No. 07/655,302 (U.S. Pat. No. 5,081,480), the disclosure of which is expressly incorporated by reference herein.

2. Description of Related Art

In a camera having a finder optical system in addition to the photographing optical system, parallax inevitably occurs. Particularly, in a camera having a macro photographing mode, there is a large degree of parallax in the macro mode. To solve this problem, it is known to provide a parallax compensating optical element which is moved into the optical path in the macro mode, or which moves the existing field frame.

However, in a known parallax compensating mechanism in which the optical path of the bundle of rays within the field of view of the finder is shifted from the optical path in a normal photographing mode, the image quality is deteriorated due to aberration, etc., which cannot be easily eliminated.

Furthermore, it is necessary to correct the diopter so that an image of an object may be observed at a close distance. To this end, in a conventional camera, a diopter correcting mechanism must be provided in addition to the parallax compensating mechanism, resulting in a complex and expensive camera.

SUMMARY OF THE INVENTION

The primary object of the present invention is to provide a simple finder for a camera having a macro photographing mode, in which the parallax and the diopter can be easily corrected.

Another object of the present invention is to provide a finder for a camera in which the parallax can be compensated in the macro mode without cluttering the field of view with photographic field correcting marks, etc.

To achieve the objects mentioned above, according to the present invention, there is provided a view finder for a camera which includes a taking optical system and a finder optical system which is separate from the taking optical system. The view finder has a normal photographic mode and a macro photographic mode. In the normal photographic mode, the finder optical system includes a field frame having a photographic field correcting mark corresponding to a close object distance. A variable power lens group is provided in the finder optical system for varying the magnification of the finder and decreasing the finder magnification in association with the shift from the normal photographic mode to the macro photographic mode.

According to another aspect of the present invention, there is provided a view finder for a camera in which an image of an object to be taken by an objective optical system is observed through an eyepiece. At least one variable power lens group is included in the objective optical system. The system includes a zoom range in which the field of view of the finder is increased and decreased by the movement of the variable power lens group to vary the magnification, and a macro range in which the variable power lens group is moved beyond one of the opposing extremes of the zoom range in a direction to decrease the magnification and correct the diopter thereof.

With this construction, very little parallax occurs in the macro mode and it is not necessary to provide a photographic field correcting mark for the macro mode in the field frame.

It is possible to control the variable power lens group in association with the shift of the photographic mode to the macro mode to thereby correct the diopter, so that a clear object image can be observed through the finder even in the macro mode.

The present disclosure relates to subject matter contained in Japanese utility model application No. 3-55369 (filed on Apr. 16, 1991) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
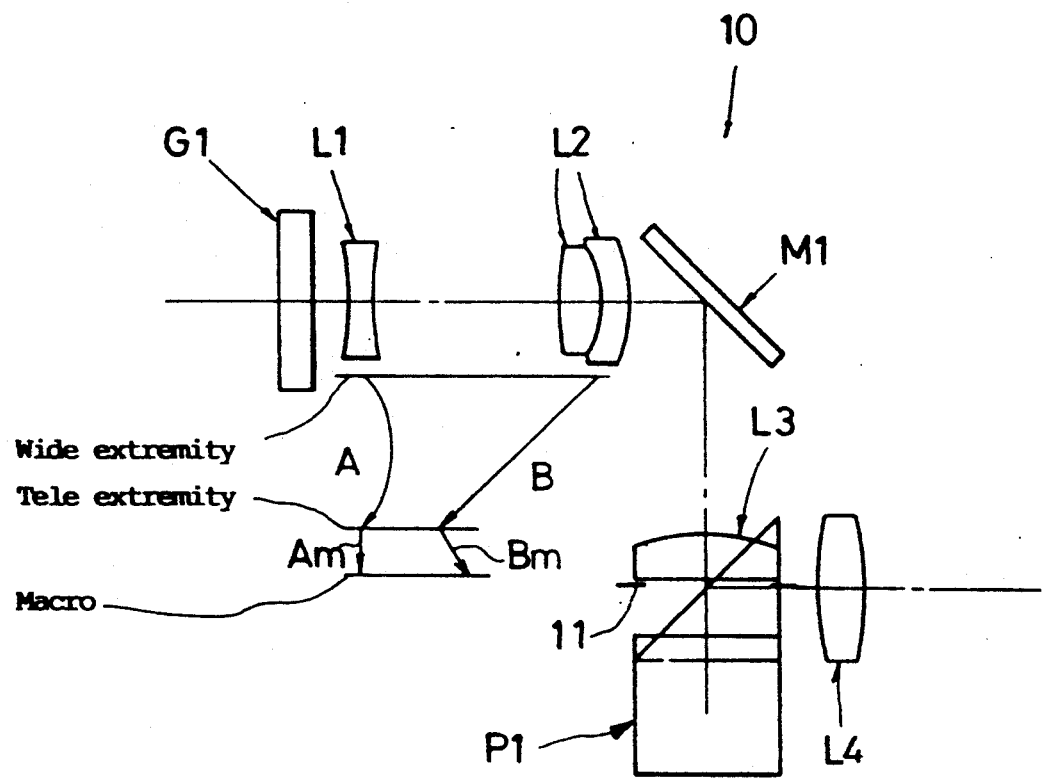
FIG. 1 is a plan view of an optical system of a finder of a camera having a macro photographic function according to the present invention.
Figure 2:
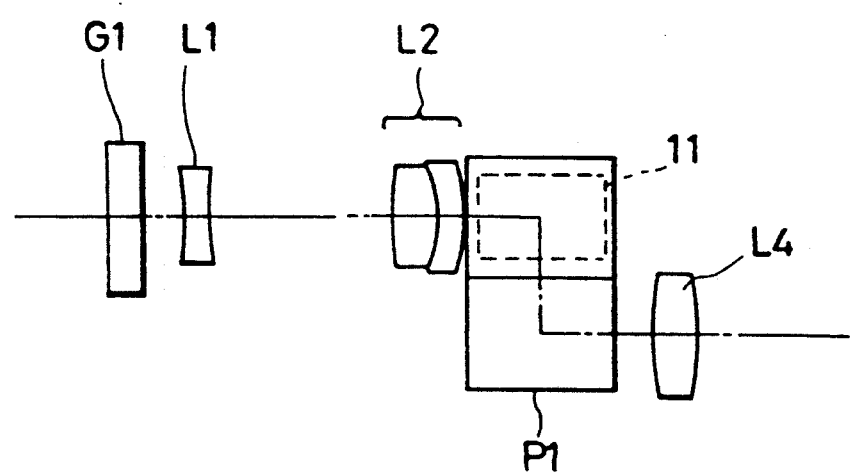
FIG. 2 is a side elevational view of FIG. 1.
Figure 3:
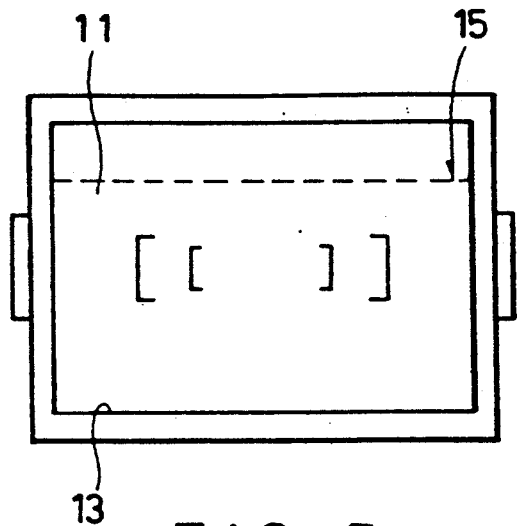
FIG. 3 is a front elevational view of a finder frame shown in FIG. 1.
Figure 4:
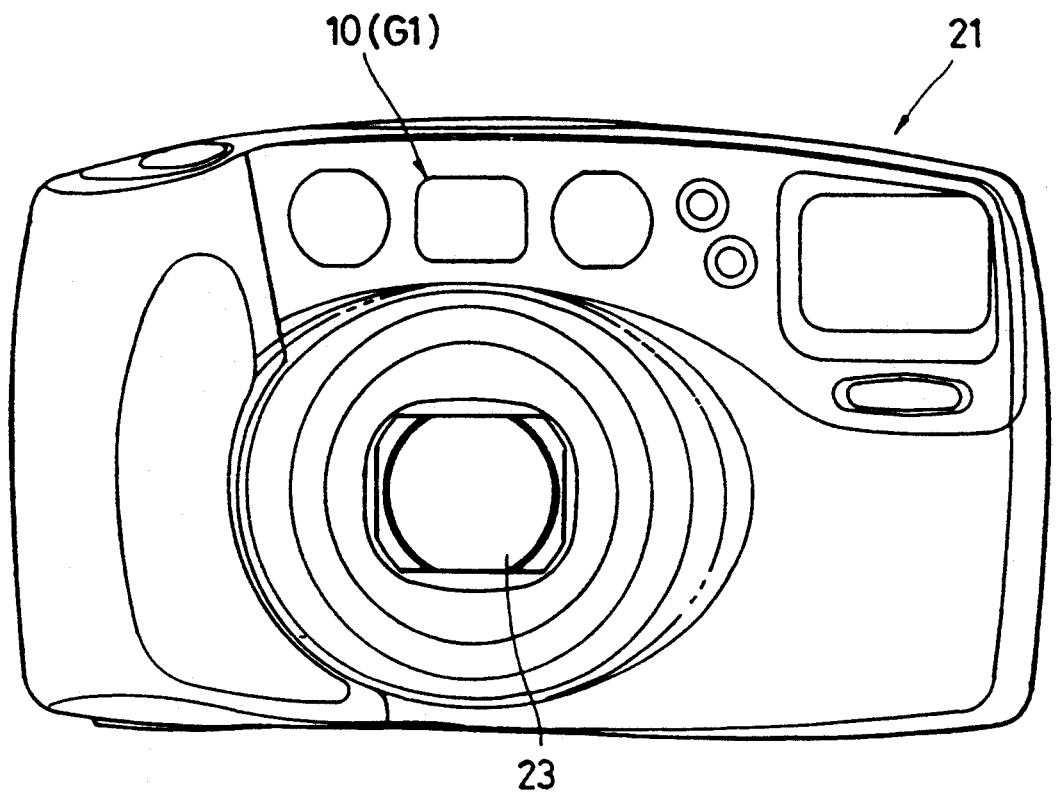
FIG. 4 is a front elevational view of a compact camera to which the present invention is applied.

FIGS. 1 and 2 are a plan view and a side elevational view of a zoom finder according to the present invention.

A zoom finder device 10 shown in FIGS. 1 and 2 is a real image type finder having a glass cover G1; a first lens group L1, which has a negative power; a second lens group L2, Which has a positive power; a mirror M1, a condenser lens L3; a Porro prism P1; and an eyepiece (ocular lens) L4, which has a positive power; in this order from the object side.

The first lens group L1 and the second lens group L2 form an objective optical system. The mirror M1 and the Porro prism P1 make up an image erecting optical system. A real image of an object formed by the objective optical lenses L1 and L2 is focused at an intermediate position between the condenser lens L3 and the Porro prism P1. A field frame plate 11 is also located in the intermediate position between the condenser lens L3 and the Porro prism P1, or the vicinity thereof, so that the object image created by the objective optical system can be observed through the eyepiece L4.

The first and second lens groups L1 and L2 are moved towards and away from each other in the direction of the optical axis along loci A and B in association with the zooming mechanism of the camera body, in which the first and second lens groups L1 and L2 are incorporated, to thereby vary the finder magnification. Namely, the first and second lens groups L1 and L2 serve as variable power lens groups to vary the finder magnification in the normal photographic mode. As is well known, the first and second lens groups L1 and L2 are driven, for example, by a cam plate or cam mechanism, etc., which is in turn driven by a zoom motor of a taking lens. This is disclosed, for example, in U.S. Pat. No. 4,944,030, which is assigned to the same assignee as that of the present application.

The finder device 10 has a telephoto extremity macro mechanism in which the photographic mode is shifted to the macro mode at the telephoto extremity (longest focal length). When the mode is shifted to the macro mode at the telephoto extremity, the first and second lens groups L1 and L2 are moved along loci Am and Bm in association with each other to expand the field of view and to correct the diopter in the positive direction. The diopter is corrected (first occurrence) so that the object image, which is formed by the objective optical system having first and second lens groups L1 and L2, is formed closer to the observer's eye with respect to the field frame plate 11. The first and second lens groups L1 and L2 serve as variable power lens groups for correcting parallax and diopter.

The following discussion will be directed to a compact camera 21 in which the finder device 10 is incorporated. The camera 21 has a taking lens 23, which has a zoom function and a telephoto extremity macro function in which the focal length is substantially retained when the zoom lens is moved beyond the telephoto extremity. Accordingly an object at a close distance can be taken (macrophotographing) as well as an object in the zoom range. The finder device 10 is provided directly above the taking lens 23, so that the optical axis of the finder device 10 and the optical axis of the taking lens 23 lie in substantially the same vertical plane. The field frame plate 11 has a field frame 13, which defines a normal photographic range (normal photographic mode), and a close distance photographic field correcting mark 15 Close distance field correcting mark 15 serves both as a photographic field correcting the close distance photographing in the normal photographic mode and as a photographic field correcting mark in the macro photographic mode.

The close distance photographic field correcting mark 15 is formed by a dotted line (discontinuous line) located at an upper portion in the field frame 13, in the illustrated embodiment. Alternatively, the close distance photographic field correcting mark 15 can be formed for example by a solid line (continuous line) and may optionally be colored by a color different from the color of field frame 13.

Figure 6:
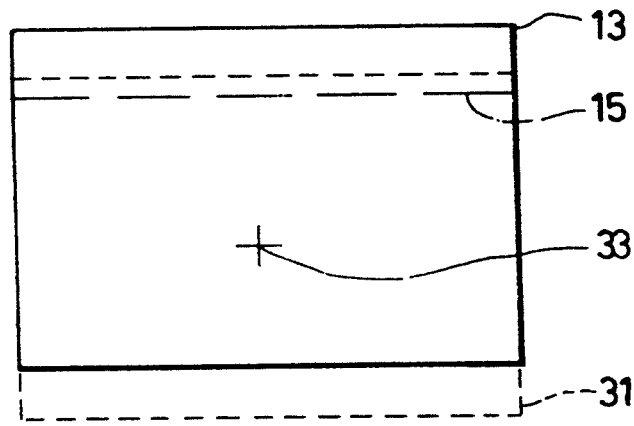
Figure 7:
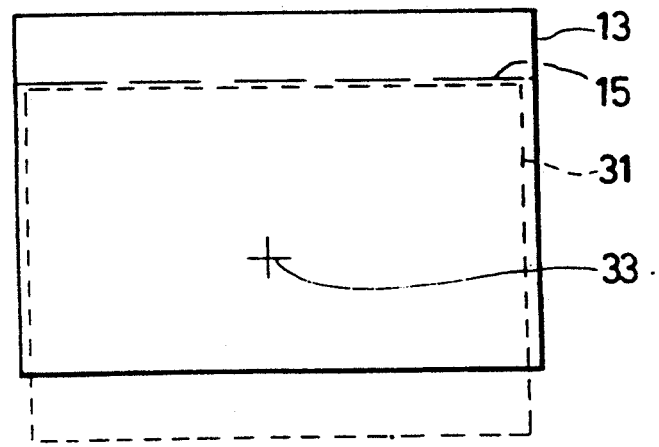
Figure 8:
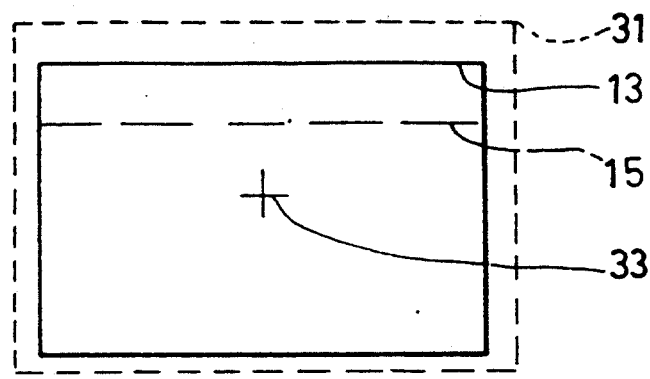
FIGS. 8 and 9 are diagrams showing a relationship between a field frame and an actual picture plane at a wide-angle extremity in a normal photographic mode, according to the present invention.
Figure 9:
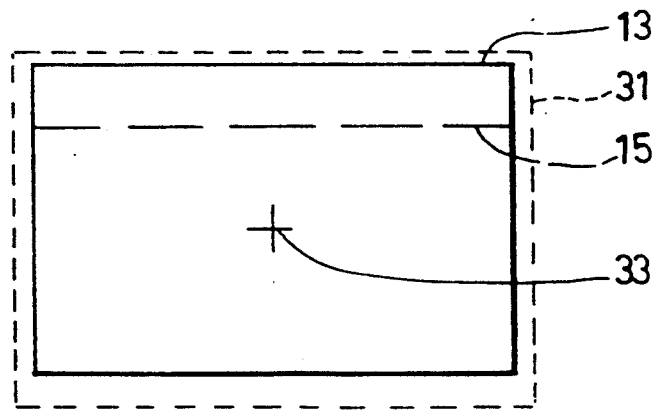
Figure 10:
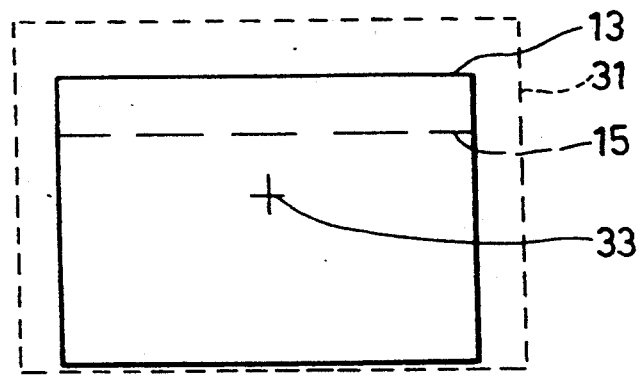
FIGS. 10 and 11 are diagrams showing a relationship between a field frame and an actual picture plane at a telephoto extremity in a normal photographic mode, according to the present invention; and, FIG. 12 is an explanatory view showing parallax between a photographic angle and a field of view of a finder according to the present invention.

FIGS. 5 through 11 show a relationship between the field frame 13 of the finder device 10, and a photographic field 31, in which a picture is actually taken by the taking lens 23. FIGS. 8 and 10 show the photographic field 31 for taking a picture of an object in an infinite photographing field in the normal photographic mode at the wide-angle extremity and telephoto extremity in the normal photographic mode, respectively.

Figure 11:
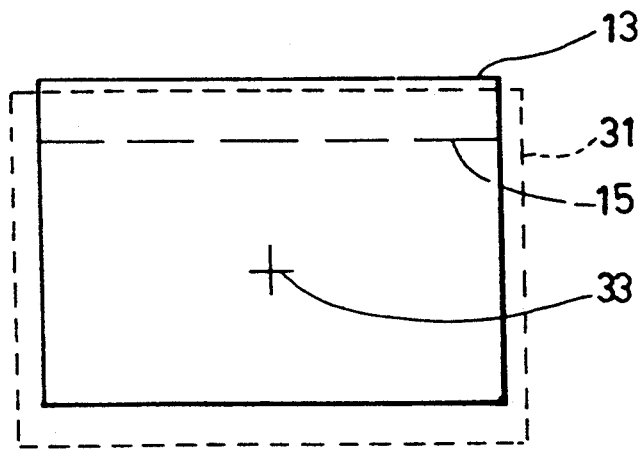

FIGS. 9 and 11 show the photographic field 31 for taking a picture of an object at the closest photographable position at the wide-angle extremity and telephoto extremity, respectively.

As can be seen in FIGS. 5 through 11, the photographic center 33 of the photographic field 31 for the infinite object in the normal photographic mode is located substantially at the center of the field frame 13. However, at the closest object distance, the photographic center 33 is shifted downward from the center of the field frame 13 due to parallax. Therefore, if it is deemed that the upper edge of the photographic field 31 is defined by the close distance photographic field correcting mark 15 upon photographing a close object, the photographic center 33 is substantially coincident with the center of the field frame defined by the field frame 13, and the close distance photographic field correcting mark 15, so that parallax can be compensated for.

On the other hand, in the macro photographic mode, the deviation of the actual photographic field 31 from the field frame 13 is increased. The photographic field 31 is shifted downward even further with respect to the field frame 13. The present invention is aimed at reducing parallax in the macro photographic mode.

To this end, in the present invention, the close distance photographic field correcting mark 15 is used to define the upper edge of the field frame 13 in the macro photographic mode, and the field of view is expanded in comparison with that at the telephoto extremity (i.e., the field magnification is decreased). In addition, the diopter is corrected in the positive direction. The correction of diopter in the positive direction means that the object image formed by the objective optical system having first and second lens groups L1 and L2 is shifted toward the eyepiece L4 (i.e., towards the photographer's eye) from the field frame plate 11. Consequently, the photographer can view a clear object image at a close distance. The relationship between the field frame 13 and the photographic center 33 in the macro photographic mode is shown in FIGS. 5 through 7.

Figure 5:
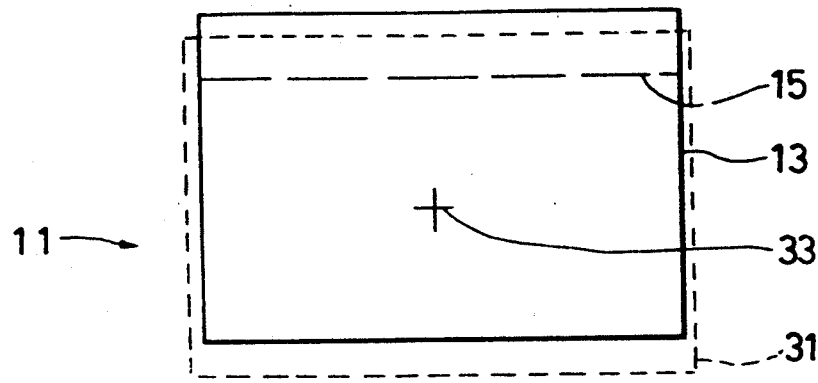
FIGS. 5, 6 and 7 are diagrams showing a relationship between a close distance field frame and an actual picture plane in a macro mode, shown in different positions, according to the present invention.

FIGS. 5, 6, 7 show the finder field frame 11 and the actual photographic field 31 at the farthest object distance (corresponding to the closest object distance in the normal photographic mode), the intermediate object distance, and the closest object distance, in the macro photographic mode, respectively.

In the macro photographic mode, the focal length of the taking lens 23 substantially corresponds to the telephoto extremity, but the field magnification is decreased, as mentioned above. Therefore, at the farthest object distance in the macro photographic mode, as can be seen in FIG. 5, the photographic center 33 of the actual photographic field 31 is located substantially at the center of the close distance photographic frame defined by the field frame 13 and the close distance photographic field correcting mark 15. As a result, there is little or no problem caused by parallax.

In the macro photographic mode, as an object's distance decreases, the photographic center 33 shifts slightly downward with respect to the field frame 13, as shown in FIGS. 6 and 7, but the displacement is practically negligible. Alternatively, the optical system can be designed such that the parallax is minimized at the intermediate object distance, as shown in FIG. 6.

Figure 12:
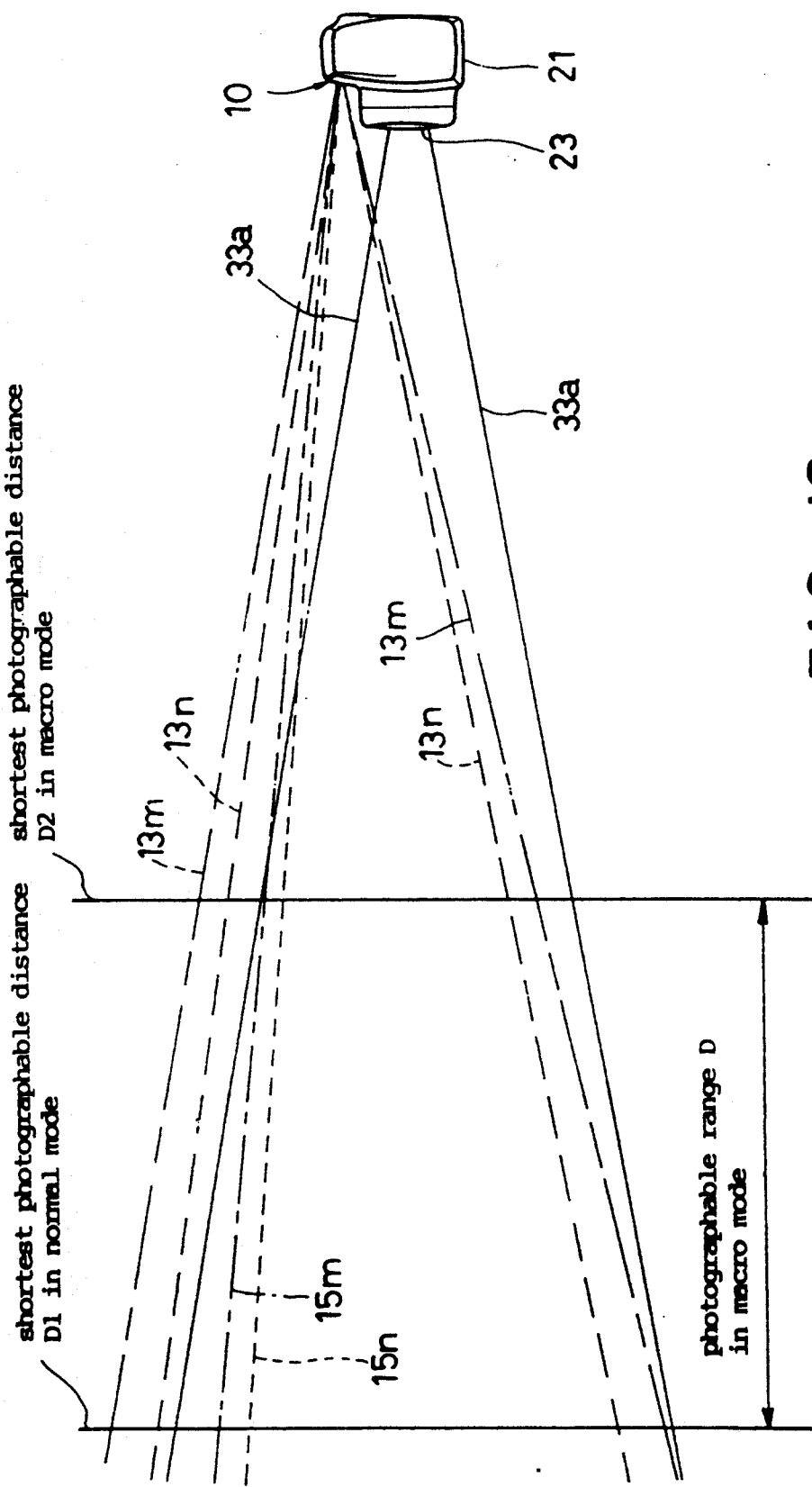

FIG. 12 shows a schematic relationship between the photographic angle, the visual field, and the object distance. In FIG. 12, numeral 33a denotes the photographic angle, 13n the visual field angle in the normal photographic mode, 13m the visual field angle at the close object distance in the normal photographic mode, 15n the visual field angle of the finder defined by the close distance photographic field correcting mark 15 in the normal photographic mode, and 15m the visual field angle defined by the close distance photographic field correcting mark 15 in the macro photographic mode, respectively. Although only upper portions of the visual field angles 15n and 15m are shown in FIG. 12, the lower portions thereof are identical to the visual field angle 13m.

As can be seen from FIG. 12, since the macro visual field angle 13m and the visual field angle 15m by the close distance photographic field correcting mark 15 are expanded in the macro photographic mode, in comparison with the normal photographic mode, to be coincidental with the photographic field, the parallax is reduced throughout the macro photographable range D (shortest photographable distance in the normal photographic mode D1—shortest photographable distance in the macro photographic mode D2) in the macro photographic mode.

Although the above discussion has been directed to an embodiment in which the finder device 10 is located directly above the taking lens 23, the present invention is not limited thereto In short, in a camera having a macro photographic mode, the basic concept of the present invention resides in the use of the correcting mark in both the normal photographic mode and the macro photographic mode in the field frame.

Although the illustrated embodiment is applied to a camera having a zoom function, the present invention can be also applied to a single focal length lens, or a multi-focal length lens.

As can be understood from the above discussion, according to the present invention, since the finder magnification in the macro photographic mode is decreased below that of the normal photographic mode for the same focal length, the inevitably occuring parallax can be minimized. Furthermore, according to the present invention, since the close distance photographic field correcting mark in the normal photographic mode is commonly used as a photographic field correcting mark in the macro photographic mode, the visual field of the finder is made free of excess marks. In addition to the foregoing, since the diopter is corrected in the macro photographic mode, a clear object image can be observed through the finder.

I claim:

1. A view finder for a camera including a taking optical system and a finder optical system separate from the taking optical system, and having a normal photographic mode and a macro photographic mode, wherein;
    said finder optical system comprises a field frame having a photographic field correcting mark at a close object distance in the normal photographic mode, and a variable power lens group for varying the magnification of the finder; and wherein,
    said variable power lens group decreases the finder magnification in association with the shift from the normal photographic mode to the macro photographic mode.

2. A view finder for a camera according to claim 1, wherein said variable lens group makes the photographic field in the macro photographic mode coincidental with the photographic field correcting mark as the said finder magnification is decreased.

3. A view finder for a camera according to claim 1, wherein said variable power lens group corrects the diopter in association with the shift from the normal photographic mode to the macro photographic mode.

4. A view finder for a camera according to claim 3, wherein the correction of the diopter is effected in a positive direction.

5. A view finder for a camera according to claim 1, wherein said variable power lens group varies said finder magnification in the normal photographic mode in association with the magnification varying operation of the taking optical system.

6. A view finder for a camera according to claim 1, wherein said finder optical system is located directly above the taking optical system as viewed from the front of the camera.

7. A view finder for a camera according to claim 6, wherein said photographic field correcting mark is located in an upper portion of said field frame.

8. A real image type view finder for a camera in which an image of an object to be taken by an objective optical system is observed through an eyepiece, comprising;
    an objective optical system having at least one variable power lens group;
    a zoom range in which a field of view of said finder is increased and decreased by movement of said at least one variable power lens group to vary the magnification; and,
    a macro range in which said at least one variable power lens group is moved beyond one of opposing extremes of the zoom range in a direction to decrease the magnification and correct the diopter thereof.

9. A view finder for a camera according to claim 8, wherein the shift from the zoom range to the macro range begins at one of the extremes of the zoom range on a long focal length side.

10. A view finder for a camera according to claim 8, wherein the correction of the diopter in the macro range, is effected so that the real image is formed by said objective optical system at a position farther away from said objective optical system than a position in which a real image in the zoom range is formed.

11. A view finder for a camera according to claim 8, in combination with a zoom lens camera having a macro photographic function.

12. A view finder for a camera according to claim 11, wherein the zoom range and macro range correspond to a zoom range and a macro range of said zoom lens camera, respectively.

13. A view finder for a camera according to claim 8, wherein said finder optical system comprises a field frame having a photographic field correcting mark at a close object distance in the zoom range.

14. A view finder for a camera according to claim 13, wherein said variable power lens group makes the photographic field at a macro photographic mode coincidental with the photographic field correcting mark as the finder magnification is decreased.

* * * * *

UNITED STATES PATENT AND TRADEMARK OFFICE
CERTIFICATE OF CORRECTION

PATENT NO. : 5,233,381
DATED : August 3, 1993
INVENTOR(S) : T. ABE

It is certified that error appears in the above-indentified patent and that said Letters Patent is hereby corrected as shown below:

At column 6, line 3 (claim 2, line 5) of the printed patent, delete "the".

At column 6, line 9 (claim 4, line 2) of the printed patent, delete "the" after "wherein" and insert-- said--.

At column 6, line 44 (claim 10, line 3) of the printed patent, delete "," after "range".

At column 6, line 52 (claim 12, line 2) of the printed patent, insert ---the--- after "and".

Signed and Sealed this

Nineteenth Day of November, 1996

Attest:

BRUCE LEHMAN

*Attesting Officer*  *Commissioner of Patents and Trademarks*